United States Patent [19]

Kühnle et al.

[11] Patent Number: 5,077,621

[45] Date of Patent: Dec. 31, 1991

[54] OPTICAL PULSE COMPRESSOR

[75] Inventors: Götz Kühnle; Sándor Szatmári, both of Goettingen-Nikolausberg, Fed. Rep. of Germany

[73] Assignee: Max-Planck-Gesellschaft zur Foerderung der Wissenschaften e.V., Goettingen, Fed. Rep. of Germany

[21] Appl. No.: 588,006

[22] Filed: Sep. 25, 1990

[30] Foreign Application Priority Data

Sep. 26, 1989 [DE] Fed. Rep. of Germany ....... 3932097

[51] Int. Cl.$^5$ .................. G02B 5/18; G02B 27/42; H01S 3/08; H01S 3/10
[52] U.S. Cl. ................. 359/566; 359/572; 359/615; 372/102; 372/700
[58] Field of Search ............ 350/96.19, 162.17, 162.2, 350/162.24, 168, 162.23; 372/102, 700

[56] References Cited

U.S. PATENT DOCUMENTS

| | | | |
|---|---|---|---|
| 4,479,220 | 10/1984 | Bor et al. | 372/102 |
| 4,696,012 | 9/1987 | Harshaw | 372/102 |
| 4,834,474 | 5/1989 | George et al. | 372/102 |
| 4,873,692 | 10/1989 | Johnson et al. | 372/102 |
| 4,913,525 | 4/1990 | Asakura et al. | 372/102 |
| 4,955,028 | 9/1990 | Alferness et al. | 372/102 |

OTHER PUBLICATIONS

Group Velocity Dispersion Optics Communications, vol. 54, #3, Jun. 1, 1985, Zs. BOR and B. Racz, pp. 165–170.
Negative Group—Velocity Dispersion J. Opt. Soc. Aw. A, vol. 1, #10, Oct. 1984, O. E. Martinez, J. P. Gordon and R. I. Fork, pp. 1003–1006.
Generation of Femtosecond Pulses Optics Letters, vol. 14, #5, Mar. 1989, J. Hebling and J. Kuhl, pp. 278–280.
Picosecond Pulse Shortening Appl. Phys. B. vol. 32, pp. 101–104 (1983), by Zs. BOR, S. Szatmari and Alexander Müller.
Optical Pulse Compression IEEE J. Quant. Electronics, vol. QE—5, #9, Sep. 1969, by Edmond B. Treacy, pp. 454–458.
Travelling—Wave Amplified Spontaneous Appl. Phys B, vol. 48, pp. 401–403, (1989), by J. Hebling, J. Klebniczki, P. Heszler, Zs. Bor & B. Racz.

Primary Examiner—Bruce Y. Arnold
Assistant Examiner—Martin Lerner
Attorney, Agent, or Firm—Frishauf, Holtz, Goodman & Woodward

[57] ABSTRACT

An optical pulse compressor having a single deflecting dispersive optical element in the form of a diffraction grating (10) or prism for temporal compression of an optical pulse, the frequency of which increases during the pulse duration. An elongated target (T) for receiving the compressed pulse is arranged in parallel with an output surface of the grating or prism. To increase the inclination of the pulse front for effective synchronous travelling wave excitation of the target the output surface of the diffraction grating or prism can be interfaced by an immersion medium or the beam path can be made to converge in the plane containing the target by a cylindrical lens or a reducing imaging optical system can be arranged between the grating or prism and the target.

10 Claims, 3 Drawing Sheets

FIG. 1a
FIG. 1b
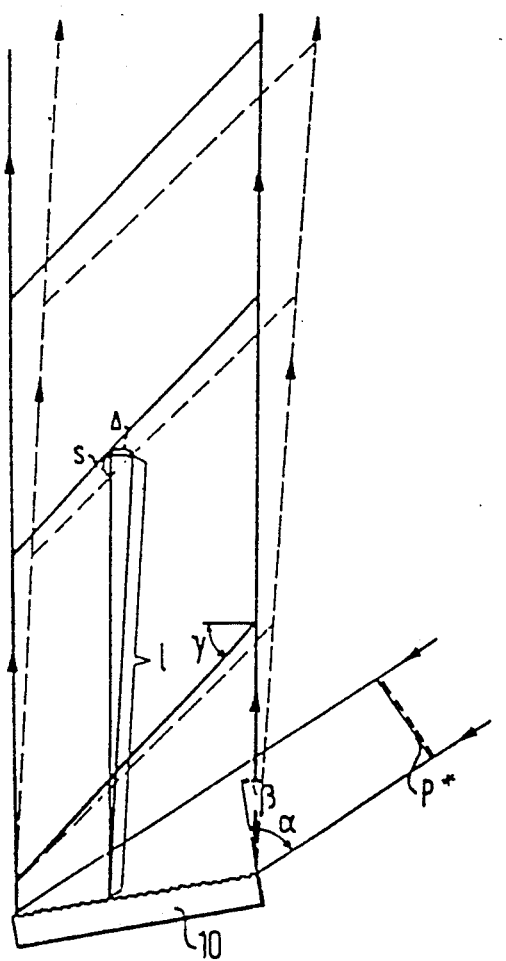
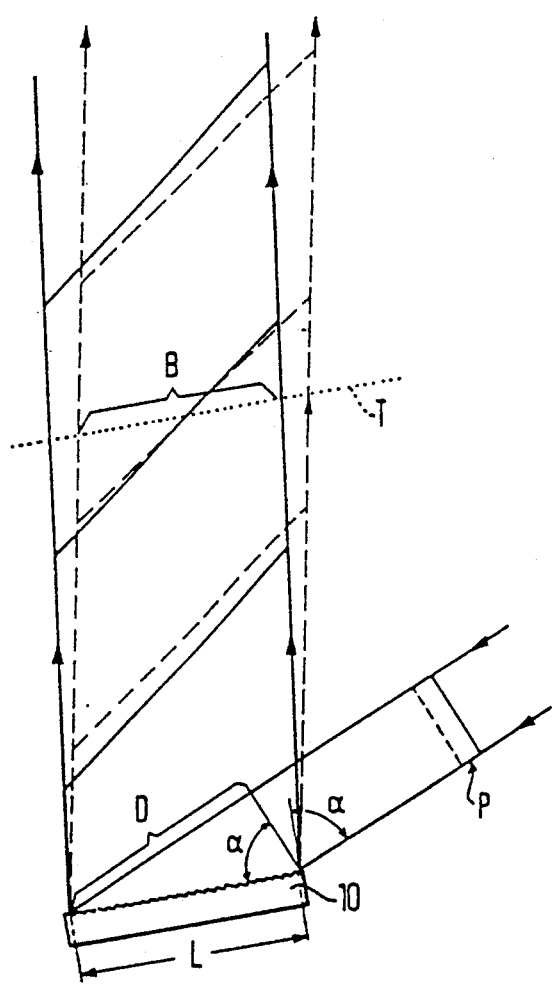

OPTICAL PULSE COMPRESSOR

FIELD OF THE INVENTION

The present invention relates to an optical apparatus for laser pulse compression.

DESCRIPTION OF THE RELATED ART

In laser physics and laser technology chirped (i.e. frequency modulated laser pulses are often encountered, particularly pulses the frequency of which during the complete pulse duration increases or decreases monotonically, especially linearly as a function of time. A positive chirp in this respect means an increase in frequency and a negative chirp a decrease in frequency. A positive chirp results from a non-frequency modulated (unchirped) pulse simply by the pulse passing through a certain length of an optical material having a normal group velocity dispersion. Since the longer wave spectral components of the pulse have a higher group velocity in the optical material than the shorter wave components, the latter, are delayed with respect to the longer, thus causing the frequency to increase according to the dispersion of the material being passed through, i.e. from the leading edge of the pulse (pulse front) to its trailing edge. Since in the narrow frequency range used by nearly all laser pulses achievable currently—with the exception of the shortest—the dispersion curve of practically every material can be approximated by a straight line, the frequency of the pulse in transit through the material is essentially a linear function of time. Chirping, however, automatically lengthens the pulse and the product of the spectral and temporal FWHM (full width at half maximum) of the pulse is greater than the characteristic value which can be easily calculated for a pulse which is not frequency-modulated (chirped) and having a certain shape, it amounting to e.g. 0.44 for a Gaussian pulse shape. A negative chirp is not achievable so easily since, for this purpose, it would have to pass through a material having abnormal dispersion; however, in almost all cases of abnormal dispersion known to date, the simultaneous absorption is so strong that the transit pulse would be excessively attenuated. In IEEE J. Quant. Electron. QE-5, 454–458 (1969) E. B. Treacy was able to show, however, that it is possible to achieve the same effect as in abnormal dispersion by using an arrangement of two optical gratings to enable a linear negative chirp to be superimposed on a laser pulse incident unchirped. Even more significant is the application in which positive chirping can be completely compensated ( for a positive chirp ) by a negative chirp having precisely the opposite frequency modulation in passing through such an apparatus—when suitably adjusted—thus producing an output pulse which is compressed temporally but no longer chirped. Due to this application this apparatus is generally termed a Treacy compressor.

As demonstrated recently by two groups, the one independent of the other—see O. E. Martinez, J. P. Gordon, R. L. Fork "Negative Group-Velocity Dispersion Using Refraction", J. Opt. Am. Al. 1003 (1984) and Z. S. Bor, B. Racz "Group Velocity Dispersion in Prisms and Its Application to Pulse Compression and Travelling Wave Excitation", Opt. Commun. 54, 165 (1985)—a pulse compressor of this kind can be configured by using two prisms which is occasionally to be preferred for practical reasons when using diffraction gratings causes difficulties due to, for instance, the losses involved or due to the lower pulsing capacity. However, the principle in both cases is precisely the same, so that it is sufficient to confine the following discussion to a variant having, for example, optical gratings, it being easy for the person skilled in the art to translate the teachings of the invention given by the example of grating arrangements to corresponding arrangements of prisms, with reference to cited literature.

SUMMARY OF THE INVENTION

A main object of the invention is to create a pulse compressor which is simple and more effective than known pulse compressors and in which merely a single deflecting dispersive optical element, i.e. in particular a single diffraction grating or prism suffices. A further object of the invention is to provide, in addition to pulse compression, excitation of a travelling wave along a target having a specific straight-line spatial configuration. A travelling wave of this kind is often needed to excite amplified spontaneous emission in a laser material, be it in a dye solution in which case the target is located in the surface of the dye solution, or be it to excite amplified spontaneous emission in the x-ray region in a hot plasma, where the target is then located on the surface of a solid object which is converted by the travelling wave into hot plasma.

The invention enables the salient requirements of such an application to be satisfied, namely to maintain precise synchronization of the travelling wave velocity of the exciter radiation (pump radiation) along the target with the propagation velocity of the photons to be amplified in the active medium of the target.

BRIEF DESCRIPTION OF THE DRAWINGS

Embodiments of the invention will now be described in more detail with reference to the drawings, wherein:

FIG. 1a is a side view of a diffraction grating showing the associated beam paths to explain the basic principle of the invention.

FIG. 1b is an embodiment of the invention as shown in FIG. 1a for compression of a positively chirped laser pulse.

DESCRIPTION OF THE PREFERRED EMBODIMENTS

Figure 2:
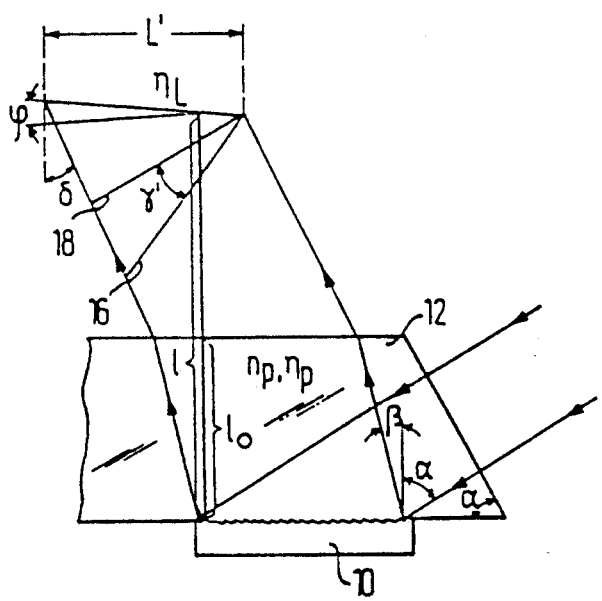
FIGS. 2 thru 4 are further embodiments of the invention.

To illustrate the basic principle of the apparatus according to the invention and to derive the quantitative relationships, FIG. 1a shows a diffraction grating 10 receiving a pulse p* from the right at an angle of incidence with respect to the vertical center-line of the grating (this pulse being unchirped). Following diffraction by the grating the mean propagational direction of the pulse ( more precisely, the diffraction of a first order resulting exclusively) with respect to the center-line through the grating forms an angle which is somewhat larger or smaller for longer and shorter wave components of the pulse respectively. The former are shown as dashed lines, the latter as solid lines. Accordingly, showing the incident pulse by a superimposed arrangement of solid and dashed lines means that this pulse is not chirped. Whilst the pulse front of the incident unchirped pulse is at a right angle to the direction of propagation, the pulse fronts of the various spectral components, following diffraction at the grating, are inclined to the direction of propagation. The angle between the present pulse front and a direction at a right angle to that of the propagation is given by $$\tan \gamma = \lambda \frac{d\epsilon}{d\lambda} \tag{1}$$

where $\lambda$ is the wavelength of the spectral component being considered and $d\epsilon/d\lambda$ is the angular dispersion of the grating given by $$\frac{d\epsilon}{d\lambda} = \frac{1}{d\cos\beta} \tag{2}$$

The various spectral components have a spacing $\Delta$ in the direction at a right angle to that of the propagation of $$\Delta = l \frac{d\epsilon}{d\lambda} \Delta\lambda \tag{3}$$

where $\Delta\lambda$ is the difference in wavelength between two spectral components being considered and l is the distance from the grating as indicated in FIG. 1. This spacing of the spectral components results in a spatial separation of the pulse fronts in the direction of propagation is given by $$s = \Delta \tan\gamma \tag{4}$$

Inserting $\Delta$ from equation (3) and $\tan \gamma$ from equation (1) produces the expression for s $$s = l\lambda \left[\frac{d\epsilon}{d\lambda}\right]^2 \Delta\lambda \tag{5}$$

from which the temporal dispersion can be derived as $$\frac{dT}{d\lambda} = \frac{s}{c\Delta\lambda} = \frac{l\lambda}{c}\left[\frac{d\epsilon}{d\lambda}\right]^2 \tag{6}$$

where c is the speed of light in a vacuum.

From FIG. 1a and the equations we see that the pulse is negatively chirped after passing through the grating and that the pulse length increases linearly as a function of the distance l from the grating; i.e. even a single deflecting dispersive element suffices to produce a negative chirp and the second dispersive element used in earlier arrangements is only necessary to return the angle of the pulse front vertical to the direction of the propagation. This also means, however, that it is possible to compensate positive chirping of an incident pulse by using a single dispersive element and thus to compress the pulse in time. The remaining inclination of the pulse front with respect to the direction of propagation can then be utilized to advantage—when correctly dimensioned—for travelling wave excitation of a target as is shown in the following.

FIG. 1b shows the same geometry as that of FIG. 1a except that here it is assumed that a positively chirped pulse P is incident from the right at an angle of $\alpha$ to the vertical center-line of the grating. As the distance of the diffracted pulse from the grating increases, the pulse is increasingly compressed and it achieves its shortest pulse duration at a position shown dotted in FIG. 1b and identified as the target T, since here all spectral components are incident one on the other. Further propagation of the pulse then produces an increasingly negative frequency modulation (chirp) and accordingly again an increasing pulse length. Of course, to be more precise, this only applies to the central region having the width B through which all of the spectral components are still able to pass and not to the regions at the edges where the outer spectral components are missing. However, as long as $\Delta <$ B and B is greater than or equal to the target length to be excited, this restriction can safely be ignored. As will also be appreciated, the target line must run parallel to the grating so that according to equation (6) the transit time of all spectral components from the grating to the target is exactly the same, i.e. in passing through the target the pulse is fully compressed.

Here, however, we have the difficulty that the maximum tilt angle (inclination) of the pulse front is limited, as can be seen from the following. From FIG. 1b we see that the maximum difference in the distance travelled D between the two outer edges of the pulse front is given by $$D = L \sin\alpha \tag{7}$$

where $\alpha$ is the angle of incidence of the beam on the grating and L is the illuminated width of the grating. For the following, we shall assume for the sake of simplicity that the difference between the illuminated width L of the grating and the useful width B of the diffracted pulse is negligible and that the length of the target is also equal to L.

When an amplified spontaneous emission is then excited by the travelling wave at the target which is propagated from the right of the target to the left, the transit time $T_L$ of the photons along the target is given by $$T_L = n_L L/c \tag{8}$$

where $n_L$ is the group velocity index of the target material at the wavelength of the amplified spontaneous emission excited. To achieve precise synchronization between the travelling wave excitation passing via the target and the photons of the amplified spontaneous emission running along the target, the transit time $T_L$ of the photons and the delay D/c between the two edges of the travelling wave must be exactly the same:

$$T_L = D/c \tag{9}$$

Using equations (7) and (8) we then have:

$$\sin \alpha = n_L \tag{10}$$

There is no real solution to this equation for values of $n_L > 1$. Even at $n_L = 1$ (e.g. for x rays) we have $\alpha = 90°$ which means a diffraction efficiency of zero for the diffraction grating. This means that in the case of optimum pulse compression over the full length of the target, which in this case runs parallel to the grating, tilting the pulse front is not sufficient to excite the travelling wave with precise synchronization.

For this reason, in earlier investigations—see e.g. Zs Bor, S. Szatmari, A.Müller, "Picosecond Pulse Shortening by Travelling Wave Amplified Spontaneous Emission", Appl. Phys. Vol. 32, 101 (1983)—target and grating were not located parallel, but at an angle to each other which although producing precise synchronization also increased the pulse duration depending on the distance between the location and the target. Assuming that the pump pulse is optimally compressed in the center of the target and that the angular requirements for synchronization are satisfied for the mean pulse wavelength, it can be shown that the temporal width increase $\Delta t$ of the pulse duration in the outer regions of the target can be expressed by $$\Delta t = \frac{\sin\phi \tan^2\gamma}{c\lambda\cos\beta} \frac{L}{2} \frac{\Delta\lambda}{2} \quad (11)$$

where $\phi$ is the angle between grating and target.

Two numerical examples of prior art will now be given to illustrate the significance of this fact. For the excitation of amplified spontaneous emission in the X ray range $n=1$, whereas in the visible range (for dye laser radiation, for instance) $n=1.5$ can be set. The other parameters, namely grating constant d, angle $\phi$ between grating and target, and angle of incidence $\Delta$ are then selected to achieve optimum compression at the center of the target and perfect synchronization between the travelling wave of the pump pulse and the generated amplified spontaneous emission pulse for each mean wavelength of the pulses. When the travelling wave is generated by a KrF laser pulse at 248 nm with a bandwidth of 1 nm and 500 fs (100 fs) uncompressed (compressed) pulse duration and when the target length L = 5 cm, we then have for the x-ray pulse at $\phi=47°$ and d =1 $\mu$m and $\alpha=30°$ a pulse width increase of 17 ps at the outer edges of the target,assuming perfect synchronization and minimum pulse widths (100 fs) at the center of the target. By contrast we achieve in the visible region for the same pump pulse and the same target length with $n=1.5$ instead of 1.0 and $d=2.10^{-4}$ mm and $\alpha=80°$ and $\phi=30°$ as the optimum parameters for the calculation, a pulse width increase of 150 ps, i.e. almost an order more than in the first example. These two examples illustrate the significance of the increase in the pulse width at the edges of the target by arranging grating and target not parallel. When using prisms the situation becomes even more complicated due to the increase in pulse width being locally dependent, as dictated by the group velocity dispersion of the material of the prisms, the thickness of which changes with the cross-section of the beam, see e.g. Bor and Rácz, l.c.; J. Hehling, J. Klebniczki, P. Hessler, Zy.Bor, B.Rácz "Travelling Wave Amplified Spontaneous Emission Excited in a Prismatic Geometry" Appl. Phys. Vol. 48, 401 (1989) and J. Hebling, J. Kuhl, "Generation of Femtosecond Pulses By Travelling-Wave Amplified Spontaneous Emission", Opt. Lett. 14, 278 (1989).

To overcome this disadvantage of prior art there are several possibilities as explained in the following:

A) Using an Immersion: One possibility of increasing the angle between the pulse front and the right angle to the direction of propagation is to increase the absolute value of D. This can be done by embedding the dispersive element in a medium having the refractive index $n_p$ or group velocity index $n_p$ (for the mean wavelength of the pump pulse in each case) as shown in FIG. 2, thus achieving an increase of D by the factor $n_p$:

$$D = \eta_p L \sin\alpha \quad (12)$$

Equation (10) thus changes to $$\eta_p \sin\alpha = \eta_L \quad (13)$$

This equation can easily be satisfied for $\eta_L > 1$ and $\alpha > 90°$ when $\eta_p > \eta_L$. It can be shown that under optimum conditions the angle $\phi$ between the target and the grating can now be obtained from the equation $$\sin\phi = -\lambda \frac{d\eta_p}{d\lambda} \frac{\sin\alpha\cos\delta}{\tan^2\gamma'} \quad (14)$$

where $\delta$ is the angle of incidence of the pump beam on the target and $\gamma^1$ is the angle between the pulse front 16 and the phase front at the location of the target.

Here again, a numerical example is given, the data of the pump pulse and the target length being again the same as in the previous example, and $\eta_L=1.5$. When a grating 10 (FIG. 2) of 4000 lines/mm is in contact with a block 12 of quartz glass having a thickness $l_o=20$ mm and the refractive index $=1.5$ and a group velocity index $\eta_p=1.6$ and a group velocity dispersion of $d\eta_p/d\lambda = -2.10^{-3}$ nm$^{-1}$ at the pump wavelength, we achieve a pulse width increase of roughly 80 fs at the outer edges of a parallel grating/target configuration ($\phi=0$) and an optimum angle of incidence $\alpha=70°$ and a length $l=34$ mm. But as soon as the target is inclined to $\phi=16°$ then we have for $\alpha=60°$ and $l=40$ mm a pulse width increase of only 0.5 fs. As we see, this measure is well suited to elongated targets since the beam is subject to considerable beam width increase due to its inclined incidence on the grating.

B) Increasing the inclination of the pulse front by reducing the focal length.

Figure 3:
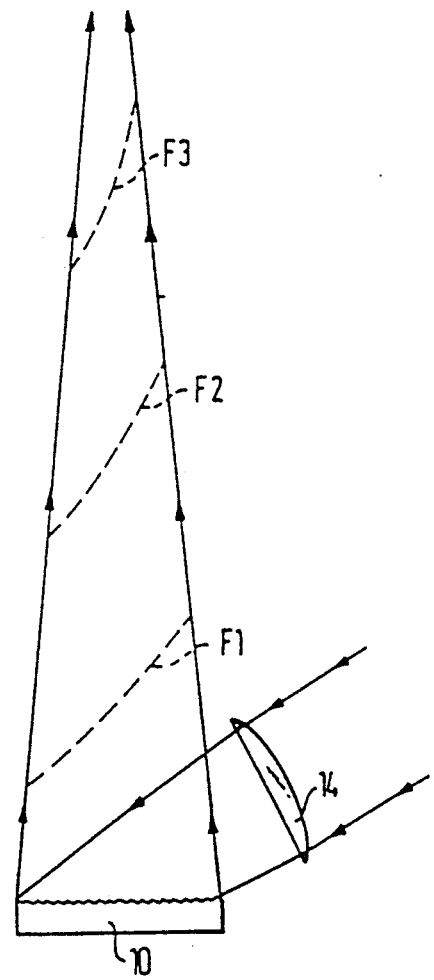

Another possibility of increasing the angle at the target is to leave the absolute value of D unchanged, but to reduce the width L' of the pulse front at the target and thus reduce the target length with respect to the width L of the illuminated area of the grating. Since due to $$\tan\gamma = \frac{D}{L'} = \frac{L\sin\alpha}{L'} \quad (15)$$

reducing the beam width produces an increase in the quotient L/L', this means a more pronounced inclination of the pulse front. One way of achieving this simply is to use a cylindrical lens (14) to converge the beam between the grating and the target as shown in FIG. 3. The cylindrical lens (14) is thus oriented so that the illuminated length of the grating or target as compared to that without using a cylindrical lens is shortened. As the distance away from the grating increases, not only the width of the beam is reduced but also the pulse front becomes increasingly inclined as shown in F1, F2 or F3. This arrangement is particularly simple and well suited to excite short targets by a travelling wave; however, here we have a certain disadvantage due to the curvature of the pulse front at the output of the target and calculations are needed for the conditions of excitation in each case, to see whether this results in excessive deviation from precise synchronization.

Figure 4:
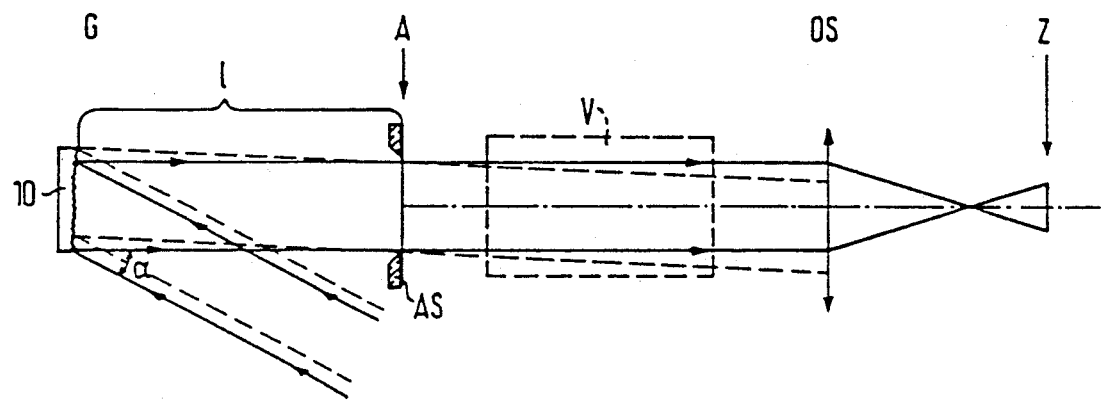

Using a more complicated, but very much more flexible arrangement enables this disadvantage to be completely overcome, namely by reducing the beam width by using an optical focussing in precisely the desired dimension as shown in FIG. 4.

As already explained on the basis of FIG. 1b there exists a plane parallel to the grating in which exact pulse compression is provided, but in which, undesirably so, the inclination of the pulse front is not adequate to achieve precise synchronization and thus an optimum travelling wave excitation. This plane is identified by A in FIG. 4. When this plane A is focussed reduced by an ideal optical system (OS) in a plane Z, the angle $\gamma$ between the pulse front and the target in the plane Z can be adjusted to practically any value, since the optical focussing results in no change in the absolute value of D. When the reduction is M the angle $\gamma^1$ between the pulse front and the target is given by $$\tan \gamma^1 = M = \tan \gamma \tag{16}$$

where $\gamma$ is again the angle between the pulse front and the plane A. For the sake of simplicity it is assumed that the beam is oriented at a right angle to the planes A and Z and thus also to the grating, i.e. the angle of diffraction $\beta = 0$. In FIG. 4 an aperture shutter (AS) is arranged in the plane A which allows the central portion of the beam still containing all spectral components (corresponding to the region B in FIG. 1b) to pass. As in FIGS. 1a and 1b, here too, the differing spectral components are distinguished by dashed and solid lines. As can easily be derived from the former we now have for precise synchronization $$\tan \gamma \frac{\eta_L}{M} \tag{17}$$

Furthermore we obtain from equations (1) and (2) with $\beta = 0$ $$\tan \gamma = \frac{\lambda}{D} \tag{18}$$

By comparing the last two equations we then obtain $$\frac{M}{d} = \frac{\eta_L}{\lambda} \tag{19}$$

In addition, the grating equation $$d \sin \alpha = \lambda \tag{20}$$

must still be satisfied. The necessary value of l can be calculated from equation (6) when using the angular dispersion of the grating and $\beta = 0$ by $$l = \frac{cd^2}{\lambda} \frac{dT}{d\lambda} \tag{21}$$

This now enables all parameters to be easily determined: from the equations (19) and (20) a suitable value for the grating constant d can be calculated for a given pump wavelength and for a certain $\eta_L$ whereby we still have the liberty of being able to freely determine d in broad limits when the reduction M and the angle of incidence $\alpha$ are suitably selected. The value of l for optimum pulse compression can be calculated from the last equation when $d/T/d\lambda$ is known.

Here too, we shall again illustrate this by a numerical example and again using the same values for the data of the pump pulse as in the earlier examples. When an existing grating having 2442 lines/mm is used at $\alpha = 37.3°$ and $B = 0°$ perfect pulse compression is obtained in the plane A spaced $l = 10.1$ cm away from the grating. With a reduction of $M = 1.65$ precise synchronization is achieved for $\eta_L = 1$ and when $M = 2.48$ also the same for $\eta_L = 1.5$ in the plane z. As will be appreciated, this arrangement is especially flexible and permits practically in all feasible cases the desired optimum pulse compression and precise synchronization.

This flexibility is achieved by the optical system (OS) which must be properly corrected for spherical and chromatic aberration and thus automatically for distortion of the pulse front—see e.g. S. Szatmári, G. Kühnle "Pulse Front and Pulse Duration Distortion in Refractive Optics, and its Compensation" Opt. Commun. 69, 60 (1988), and Zs.Bor "Distortion of Femtosecond Laser Pulses in Lenses" Opt. Lett. 14, 119 (1989). Either achromatic lenses or, especially in the ultraviolet region, refractive optics can be used for this purpose. An optical system of this kind can be designed almost free of any loss without reducing the gain in efficiency as compared to earlier methods of pulse compression using two dispersive elements whereas in this case only a single element is required, thus reducing the losses considerably. On top of this, the angle of incidence at the dispersive element in the last-mentioned arrangement can be optimally adjusted, e.g. for a grating, to the so-called Blaze angle, or for a prism, to the Brewster angle. Using an optical system (OS) also has the advantage that by focussing a virtual plane ahead of the grating, negative chirped pulses can also be compressed, i.e. in this case, the arrangement produces a positive chirp. One further property of this arrangement can be seen in it providing optimum compression of the pump pulse only in the planes A and Z, whilst at other points in the system the pulse is chirped and thus longer. Since longer pulses can be amplified with better efficiency, it is, for instance, easily possible to locate the last amplifier V for the pump pulse between the plane A and the optical system (OS) as shown by the dashed lines in FIG. 4.

The method implemented by the apparatus as shown in FIG. 4 for effective amplification of chirped pulses with simultaneous compression in the target plane using spatially-evolving frequency modulation has major advantages over previous methods ( P. Mani, D. Strickland, P. Bado, M. Pessot and G. Mourou: IEEE J. Quant. Electron. QE-24 (1988) 398; M. Pessot, J. Squier, P. Bado, G. Mourou and D. J. Harter IEEE J. Quant. Electron. QE-25 (1989) 61). Until now the fast laser pulse was chirped and lengthened by an arrangement of several optical elements. This was followed by amplification of these lengthened pulses before the amplified pulses were again compressed by a compressor. These known optical apparatuses are highly complicated ( and thus difficult to adjust) and inefficient. In addition, the former method involved several optical elements at the output of the amplifier thus making losses inevitable and where the intensity may already be very high.

In the method of amplification described in this paper using spatially-evolving frequency modulation the amplifier can be positioned at the output of the optical system (OS) thus eliminating the need for any further optical element between the amplifier and the target.

When the amplifier is positioned in the vicinity of the focal plane of the optical system the individual spectral components are spatially separated so that the pulse length is longer and thus each spectral component can be separately amplified in amplifiers producing homogenous pulse width increase, thus resulting in the amplifier functioning as if producing an inhomogenous pulse width increase. In the input region of the optical system (OS) the pulse duration is described by the equation (6); whereas at the output of the optical system (OS) the temporal dispersion can be described by simple geometrical considerations expressed by $$\frac{dT}{d\lambda} = \left[\frac{dT}{d\lambda}\right]_0 - \left[\frac{1}{f} - \frac{1}{x}\right]^{-1} \frac{\lambda}{c} \left[\frac{d\epsilon}{d\lambda}\right]^2 \quad (6a)$$

where x is the distance away of the optical system (OS) and f its focal length. The term $(dT/d\lambda)$ describes the temporal dispersion at the location of the optical system (OS).

Figure 5:
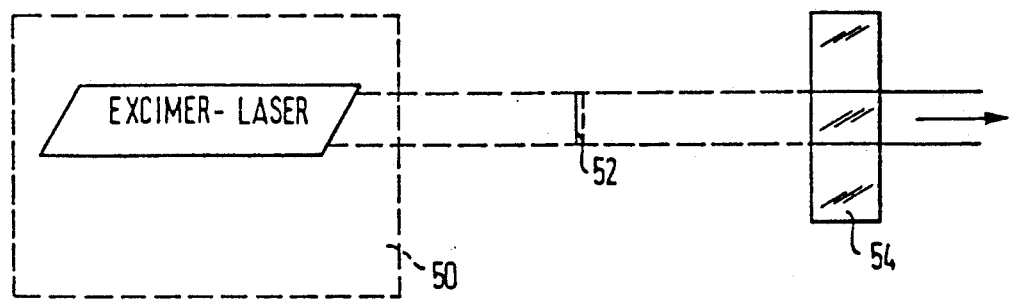
FIG. 5 is a schematic representation of an arrangement for generating positively chirped laser pulses.

FIG. 5 shows, for example, an arrangement for generating an ultrashort laser beam pulse essentially by positive chirping. This arrangement comprises a KrF Excimer laser 50, furnishing laser beam pulses 52 with a wavelength of 248 nm, a bandwidth 1 nm and a duration of 500 fs which already signifies positive chirping. If desirable, the depth of modulation (frequency swing) can be further increased by one or more additional dispersive optical elements, e.g. by a quartz block 54 of suitable thickness in the beam path.

The present invention thus creates the dual possibility of either compressing a positively chirped laser beam pulse or achieving travelling wave excitation of an elongated target by a positively chirped or unchirped laser beam pulse whilst simultaneously shortening the pulse duration. The apparatus according to the invention thus produces a negative chirp which can be used to compensate a positive chirp and thus to reduce the half-value width and, accordingly; the duration of laser beam pulses. The present apparatus is particularly suitable for ultrashort laser beam pulses, i.e. pulses having a temporal half-value width in the picosecond range and below. As already mentioned, the arrangements discussed here are mainly intended to serve as examples to illustrate how these apparatuses function with only a single dispersive element to produce pulse compression and simultaneously to excite travelling waves precisely synchronized. On the basis of the examples given here the person skilled in the art can, of course, formulate further modifications with ease without exceeding the framework of the invention. For example, as shown in FIG. 3, the cylindrical lens can also be arranged in the beam path at the output of the grating or the desired convergency of the beam path can be achieved in the plane containing the target also by a diffraction grating of concave curvature.

We claim:

1. An apparatus for irradiating an elongated target with a shortened optical pulse having a pulse front tilt relative to said target, said apparatus comprising:

means for generating an optical pulse having a predetermined frequency modulation chirp and launching said optical pulse on a first optical beam path;

optically dispersive and deflecting means for dispersing and deflecting said optical pulse by means of a single optical element having an input surface intersecting said first optical beam path and an output surface from which said optical pulse is launched on a second optical beam path after dispersion and deflection thereof;

means for maintaining said target in a position parallel to said output surface of said optical element at a predetermined distance l from said output surface in said second optical beam path, said distance l being defined by the following equation:

$$l = \frac{c}{\lambda} \frac{dT}{d\lambda} / (d\epsilon/d\lambda)^2$$

in which
is the vacuum speed of light,
$\lambda$ is the wave-length of the pulse on said first optical path, $$\frac{dT}{d\lambda}$$

is the positive chirp of the pulse on said first optical path, and $$\frac{d\epsilon}{d\lambda}$$

is the angular dispersion of the optical element, and means for increasing the pulse front tilt at said target comprising a body of an immersion medium having an increased group velocity index and interposed in a length of said second beam path adjacent to said output surface.

2. The apparatus as claimed in claim 1, wherein said immersion medium is a planoparallel block of a transparent material.

3. The apparatus as claimed in claim 1, wherein said single optical element of said optically dispersive and deflecting means is a diffraction grating.

4. An apparatus for irradiating an elongated target having a length dimension with a shortened optical pulse having a pulse front tilt relative to said target, said apparatus comprising:

means for generating an optical pulse having a predetermined frequency modulation chirp and launching said optical pulse on a first optical beam path;

optically dispersive and deflecting means for dispersing and deflecting said optical pulse by means of a single optical element having an input surface intersecting said first optical beam path and an output surface from which said optical pulse is launched on a second optical beam path after dispersion and deflection thereof;

means for maintaining said target in a position parallel to said output surface of said optical element at a predetermined distance l from said output surface in said second optical beam path, said distance l being defined by the following equation:

$$l = \frac{c}{\lambda} \frac{dT}{d\lambda} / (d\epsilon/d\lambda)^2$$

in which
c is the vacuum speed of light,
λ is the wave-length of the pulse on said first optical path, $$\frac{dT}{d\lambda}$$

is the positive chirp of the pulse on said first optical path, and $$\frac{d\epsilon}{d\lambda}$$

is the angular dispersion of the optical element, and means for increasing the pulse front tilt at said target comprising a cylindrical lens interposed in said optical beam path for converging said optical pulse in a plane containing the length dimension of said target, which plane of convergence is also a plane of maximum dispersion of said optical element.

5. The apparatus as claimed in claim 4, wherein said cylindrical lens is interposed in said first optical beam path.

6. The apparatus as claimed in claim 4, wherein said single optical element of said optically dispersive and deflecting means is a diffraction grating.

7. An apparatus for irradiating an elongated target with a shortened optical pulse having a pulse front tilt relative to said target, said apparatus comprising:

means for generating an optical pulse having a predetermined frequency modulation chirp and launching said optical pulse on a first optical beam path;

optically dispersive and deflecting means for dispersing and deflecting said optical pulse by means of a single optical element having an input surface intersecting said first optical beam path and an output surface from which said optical pulse is launched on a second optical beam path after dispersion and deflection thereof;

means for maintaining said target in a position parallel to said output surface of said optical element at a predetermined distance l from said output surface in said second optical beam path, said distance l being defined by the following equation:

$$l = \frac{c}{\lambda} \frac{dT}{d\lambda} / (d\epsilon/d\lambda)^2$$

in which
c is the vacuum speed of light,
λ is the wave-length of the pulse on said first optical path, $$\frac{dT}{d\lambda}$$

is the positive chirp of the pulse on said first optical path, and $$\frac{d\epsilon}{d\lambda}$$

is the angular dispersion of the optical element, and means for increasing the pulse front tilt at said target comprising a reducing optical system interposed in said second optical beam path between said output surface and said target.

8. The apparatus as claimed in claim 7 further comprising a laser amplifier interposed in said second optical beam path, between said output surface and said optical system.

9. The apparatus as claimed in claim 7, wherein said single optical element of said optically dispersive and deflecting means is a diffraction grating.

10. An apparatus for irradiating an elongated target with a shortened optical pulse having a pulse front tilt relative to said target, said apparatus comprising:

means for generating an optical pulse having a predetermined frequency modulation chirp and launching said optical pulse on a first optical beam path;

optically dispersive and deflecting means for dispersing and deflecting said optical pulse by means of a single optical element having an input surface intersecting said first optical beam path and an output surface from which said optical pulse is launched on a second optical beam path after dispersion and deflection thereof;

means for maintaining said target in a position parallel to said output surface of said optical element at a predetermined distance l from said output surface in said second optical beam path, distance l being defined by the following equation:

$$l = \frac{c}{\lambda} \frac{dT}{d\lambda} / (d\epsilon/d\lambda)^2$$

in which
c is the vacuum speed of light,
λ is the wave-length of the pulse on said first optical path, $$\frac{dT}{d\lambda}$$

is the positive chirp of the pulse on said first optical path, and $$\frac{d\epsilon}{d\lambda}$$

is the angular dispersion of the optical element.

* * * * *